United States Patent
Collins et al.

[11] Patent Number: 6,083,578
[45] Date of Patent: Jul. 4, 2000

[54] DESIGN IMPROVEMENTS TO VACUUM GLAZING

[75] Inventors: Richard Edward Collins, Riverstone; Jian-Zheng Tang, Merrylands, both of Australia

[73] Assignee: University of Sydney, New South Wales

[21] Appl. No.: 09/220,186

[22] Filed: Dec. 22, 1998

Related U.S. Application Data

[62] Division of application No. 08/817,791, Apr. 18, 1997, Pat. No. 5,891,536.

[30] Foreign Application Priority Data

Oct. 19, 1994 [AU] Australia ............................. PM8889

[51] Int. Cl.⁷ ....................................................... E06B 3/66
[52] U.S. Cl. .......................... 428/34; 428/120; 52/786.1
[58] Field of Search ................... 428/34, 120; 52/786.1, 52/786.13

[56] References Cited

U.S. PATENT DOCUMENTS

| | | |
|---|---|---|
| 1,370,974 | 3/1921 | Kirlin . |
| 2,401,552 | 6/1946 | Cox . |
| 3,783,084 | 1/1974 | Quenett . |
| 3,916,871 | 11/1975 | Estes et al. . |
| 3,936,553 | 2/1976 | Rowe . |
| 3,990,201 | 11/1976 | Falbel . |
| 4,132,218 | 1/1979 | Bennett . |
| 4,169,985 | 10/1979 | Ernsthausen et al. . |
| 4,180,426 | 12/1979 | Oustin et al. . |
| 4,367,108 | 1/1983 | Valimont et al. . |
| 4,647,327 | 3/1987 | Rase . |
| 4,683,154 | 7/1987 | Benson et al. . |
| 4,786,344 | 11/1988 | Beuther . |
| 5,009,218 | 4/1991 | Bächli . |
| 5,107,649 | 4/1992 | Benson et al. . |
| 5,124,185 | 6/1992 | Kerr et al. . |
| 5,270,084 | 12/1993 | Parker . |
| 5,657,607 | 8/1997 | Collins et al. . |
| 5,664,395 | 9/1997 | Collins et al. . |

FOREIGN PATENT DOCUMENTS

| | | |
|---|---|---|
| 210 104 | 7/1957 | Australia . |
| 16618/67 | 7/1969 | Australia . |
| 67280/87 | 11/1990 | Australia . |
| 61738/90 | 4/1991 | Australia . |
| PCT/AU90/00364 | 5/1991 | Australia . |
| 1290624 | 10/1991 | Canada . |
| 0 047 725 B1 | 12/1985 | European Pat. Off. . |
| 0 421 239 A2 | 4/1991 | European Pat. Off. . |
| 0 247 098 B1 | 3/1992 | European Pat. Off. . |
| 0 645 516 A2 | 3/1995 | European Pat. Off. . |
| 0489 042 B1 | 6/1996 | European Pat. Off. . |
| 2294315 | 12/1974 | France . |
| 2300860 | 10/1976 | France . |
| 2 367 180 | 5/1978 | France . |
| 2 483 564 | 12/1981 | France . |
| 387655 | 1/1924 | Germany . |
| 1 046 294 | 12/1958 | Germany . |
| 2 152 071 | 2/1973 | Germany . |
| 25 20 062 A1 | 11/1976 | Germany . |
| 29 51 330 A1 | 7/1981 | Germany . |
| 36 15 179 A1 | 2/1987 | Germany . |
| 5 302477 | 11/1993 | Japan . |
| 588 008 | 5/1977 | Switzerland . |
| 683855 | 12/1950 | United Kingdom . |
| 1 100 837 | 1/1968 | United Kingdom . |
| 1 108 593 | 4/1968 | United Kingdom . |
| WO 93/15296 | 9/1993 | WIPO . |
| WO 94/24398 | 10/1994 | WIPO . |
| WO 95/01493 | 1/1995 | WIPO . |

*Primary Examiner*—Donald Loney
*Attorney, Agent, or Firm*—Kennedy Covington Lobdell & Hickman

[57] ABSTRACT

Vacuum glazing comprising two sheets of glass, hermetically sealed around the edge, with a thermally insulating internal vacuum, and an array of support pillars placed between the glass sheets to be in contact therewith, wherein the pillars are one piece elements consisting of a core or central body, made of a material of higher compressive strength, and at least one contact layer, made of a softer metallic or carbon material, the contact layer being arranged to provide an integral interface between at least one of the ends of the central body and the adjacent glass sheet, the contact layer being arranged to absorb shear forces.

6 Claims, 4 Drawing Sheets

DESIGN IMPROVEMENTS TO VACUUM GLAZING

This is a U.S. divisional patent application claiming priority under 35 U.S.C. §120 from allowed U.S. patent application Ser. No. 08/817,791 filed Apr. 18, 1997, now U.S. Pat. No. 5,891,536 for Design Improvements to Vacuum Glazing, which is a national patent application of international patent application serial no. PCT/AU95/00640 filed Sep. 28, 1995, which in turn claims priority under 35 U.S.C. §119 to Australian patent application serial no. PM 8889 filed Oct. 19, 1994.

INTRODUCTION

This invention concerns design improvements to vacuum glazing. Vacuum glazing consists of two sheets of glass, hermetically sealed around the edge, with a thermally insulating internal vacuum. In order to maintain the separation of the glass sheets under the influence of the large forces due to atmospheric pressure, an array of very small support pillars is placed over the surface of the glass sheets.

BACKGROUND OF THE INVENTION

The design of vacuum glazing involves a complex set of trade offs between thermal performance and stress. In particular, the support pillars serve to concentrate the forces due to atmospheric pressure, leading to high levels of stress in the glass in the immediate vicinity of the support pillars. Such stresses can lead to local fractures of the glass. Further, the glass sheets bend over the support pillars giving rise to regions of tensile stress on the external surfaces of the glass sheets immediately above the support pillars. In addition, the pillars themselves experience high levels of stress, and must be made out of a material which has a very high compressive strength. Finally, the support pillars themselves act as thermal bridges between the glass sheets, leading to heat flow through the glazing.

Substantial progress has been made in the design and manufacture of vacuum glazing over the last few years. Vacuum glazings up to 1 m×1 m have been produced with high levels of thermal insulation. It has been shown that reasonable design compromises can be achieved between the competing constraints associated with mechanical tensile stress on the one hand, and heat flow through the glazing on the other.

The support pillars concentrate the forces due to atmospheric pressure leading to high stresses in the glass and in the pillars. The nature of this stress concentration is well understood. The probability of fracture due to the concentrated forces can be determined by reference to the literature on indentation fracture of glass. In the design approach for vacuum glazing, dimensions of the pillar array are chosen to ensure that the formation of classical conical indentation fractures in the glass due to the support pillars should not occur.

Experience with the production of vacuum glazing has shown that there is another mode of fracture which can occur in the glass sheets near the support pillars. These fractures arise because of shear (sideways) stresses between the glass sheets and the pillars. The shear stresses are associated with in-plane movement of one glass sheet relative to another. Such movement can occur because of bending of the glass sheets, particularly complex bending modes in which the sheets are not deformed spherically, or because of temperature non-uniformities in either glass sheet. Either influence tends to cause the interface between the pillar and one glass sheet to move sideways relative to this interface on the other sheet. The large axial force between the pillars and the glass sheets prevents the contacting surfaces from moving relative to each other. This results in shear force between the support pillar and the glass sheets and leads to small crescent shaped fractures in the glass sheets adjacent to the pillars. The fact that these fractures are associated with shear stress can be confirmed by observing that they tend to be seen in pairs, on opposite edges of the support pillars in either glass sheet.

One of the reasons why these shear stresses occur is because, in practical designs of vacuum glazing, the support pillars must be made of material of very high compressive strength. If the pillars are not of high enough compressive strength, they deform inelastically during the establishment of the vacuum in the glazing, leading to large bending of the glass sheets in the vicinity of the edge seal. The fact that the support pillars are of high strength means that they do not deform significantly when shear forces are present.

SUMMARY OF THE INVENTION

The invention provides a vacuum glazing comprising two sheets of glass, hermetically sealed around the edge, with a thermally insulating internal vacuum, and an array of support pillars placed between the glass sheets to be in contact therewith, wherein the pillars are one piece elements consisting of a core or central body, made of a material of higher compressive strength, and at least one contact layer, made of softer metallic or carbon material, the contact layer being arranged to provide an integral interface at at least one of the ends of the central body and the adjacent glass sheet, the contact layer being arranged to absorb shear forces.

A pillar of this construction can have a very high compressive strength overall, provided that the contact layer of softer material on one or both ends of the core is relatively thin. However, since the softer material contact layer can deform more readily under shear than the core, a small amount of lateral sideways movement is possible. This reduces the magnitude of the stress in the glass plates, and thus decreases the chance of formation of a shear crack.

The dimensions of the support pillars are relatively non-critical. Typically, support pillars are 0.1 to 0.2 mm in height overall, and approximately 0.2 to 0.3 mm in diameter. The contact layer of soft material on one or both ends of the pillar can be up to 30 $\mu$m (0.03 mm) thick without causing stresses near the edge of the glazing which are too large. The materials of the cores and the soft contact layers are capable of withstanding the high temperature (about 500° C.) which is necessary for formation of the glazing edge seal without excessive oxidation or annealing. They are also compatible with the high internal vacuum.

Preferably, the layer of softer metallic material is selected from the group consisting of nickel, iron, chromium, copper, silver, gold, aluminium, and alloys of these metals.

In one embodiment, the pillars each comprise two substantially flat parallel stand faces which respectively engage said glass sheets when in a proper disposition between said glass sheets, and means for orienting each said pillar into said proper disposition when each said pillar is placed between said glass sheets, said orientation means comprising at least one side extending between said stand faces having a cross-section disposed between and parallel to said stand faces that is larger than at least one of said stand faces.

One method to produce integral support pillars with a core and soft contact layer on one, or both contact ends of the pillar is to begin with a composite sheet of material consisting of a high strength central layer, and a soft layer on one, or both sides. The pillars are then formed from this sheet by conventional techniques. The pillars can be made mechanically, by stamping, punching, abrading or sawing the composite sheet. Alternatively they can be chemically or electrolytically etched from the sheet using photolithographic methods.

An alternative way of producing the pillars is to deposit the soft layer after the formation of the hard cores. The layer can be deposited using conventional electrolytic, or electrolysis plating methods. In this case, the soft layer also coats the sides of the pillars, but this does not affect the operation of the soft layer on the ends. Pillars of this type can also be made by plastically deforming a hard core into a flat disk. The core may be coated with soft material either before, or after the deformation process.

A further advantage of the composite pillar construction described here is that it ensures that the ends of the pillars contact the glass uniformly over the entire contact area of the pillar. There is some evidence that very hard pillars cannot be manufactured with entirely plain flat contact surfaces and therefore do not contact the glass uniformly and that this increases the local stresses in the glass, thus increasing the chance of fracture. The small deformation that occurs in the soft material on the end of the pillars overcomes this problem.

BRIEF DESCRIPTION OF DRAWINGS

The invention will now be described, by way of example only, with reference to the accompanying drawings, in which:

FIG. 1b is a cross-sectional view of the glazing of FIG. 1a;

DETAILED DESCRIPTION OF THE PREFERRED EMBODIMENT

Figure 1A:
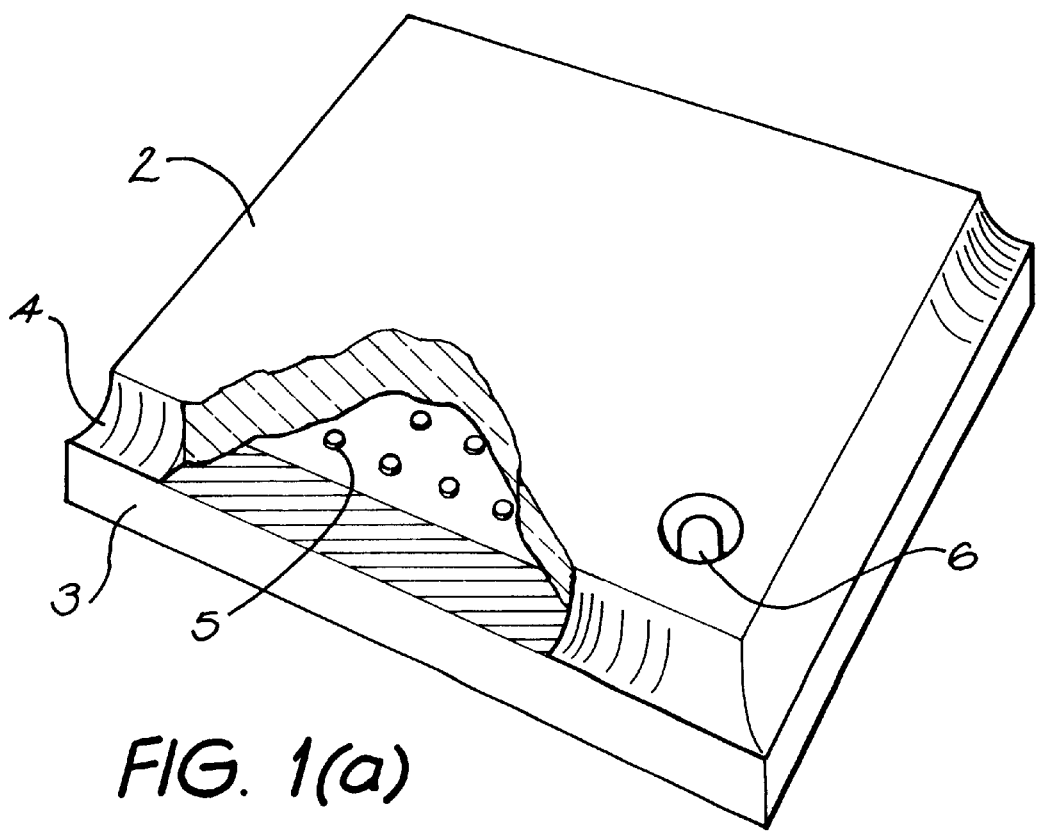
FIG. 1a is a perspective view of conventional vacuum glazing.
Figure 1B:
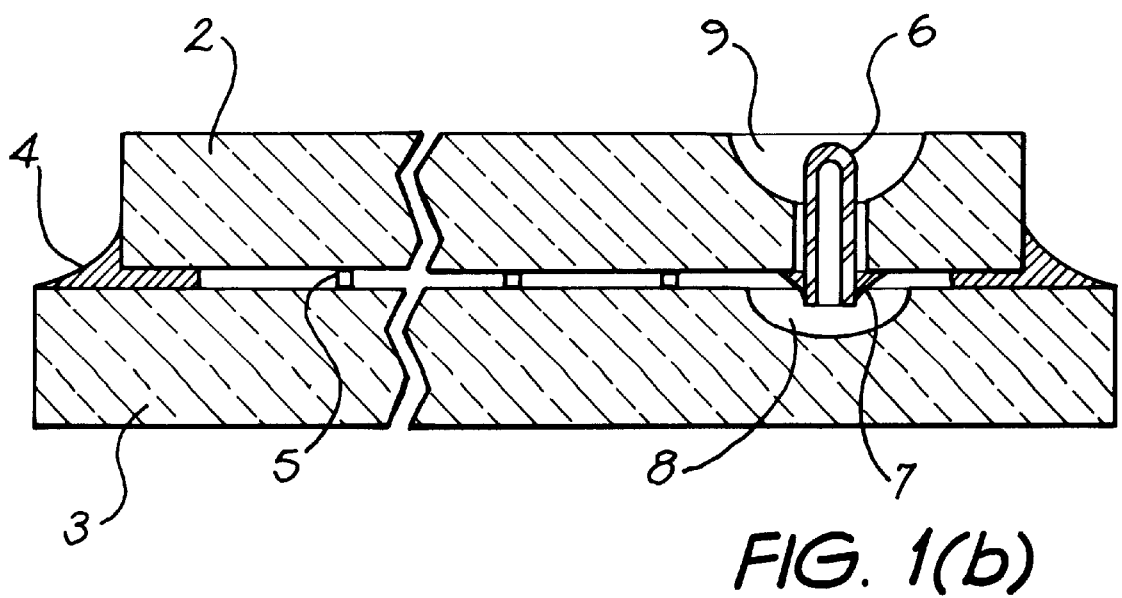

Referring now to FIG. 1 vacuum glazing 1 comprises two sheets of glass 2 and 3, hermetically sealed around the edge with a solder glass seal 4 to enclose a vacuum. An array of support pillars 5 placed between the glass sheets maintain their separation against the large forces due to atmospheric pressure. Internal transparent low emittance coatings on one, or both of the glass sheets, may be used to reduce radiative heat transport to low levels.

The vacuum will often be established after formation of the structure by pumping atmosphere from between the sheets out through a pump-out tube 6. Pump-out tube 6 will be sealed into a hole in glass sheet 2 by the use of a solder glass seal 7. A cavity 8 is machined into the other glass sheet 3 in registration with the end of the pump-out tube in order to accommodate it in a small place provided between the sheets of glass. A second cavity 9 machined into the outer face of the first glass sheet 2 accommodates the external stump of the pump-out tube 6 after it has been tipped-off and closed, following its use to evacuate the panel.

Figure 2:
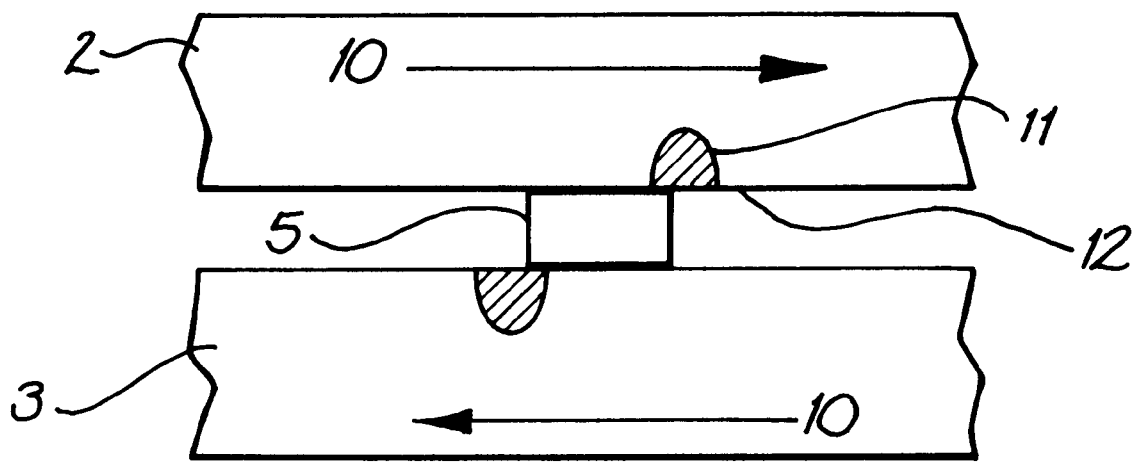
FIG. 2 is a scratch-section illustrating the formation of crescent cracks due to shear forces.

Sideways, or shear stresses between the glass sheets and the pillars will arise when there are in-plane movements of one glass sheet relative to the other. These movements occur during bending of the glass sheets or as a result of temperature differences between the sheets. As shown in FIG. 2 this results in shear forces 10 building up between the support pillars and the glass sheets, and to regions of high tensile stress 11. Small crescent shaped cracks 12 can arise and be observed in pairs on opposite edges of the support pillars in either glass sheet.

Figure 3:
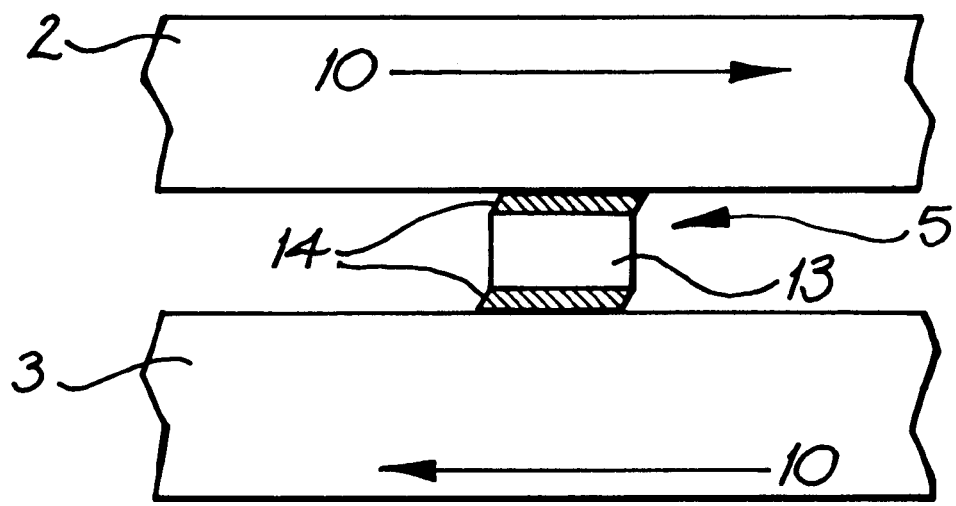
FIG. 3 is a scratch-section illustrating a first aspect of the present invention.

Referring now to FIG. 3, the support pillar 5 is of a composite design having a high compressive strength core 13, and soft ends 14. This pillar has a very high compressive strength overall, provided that the layers of soft material on either end are relatively thin. However, under shear the soft material can deform permitting a small amount of lateral sideways movement, and reducing the magnitude of the stress in the glass sheets and decreasing the chance of formation of shear cracks.

The support pillars are usually 0.1 to 0.2 mm in height overall, and approximately 0.2 to 0.3 mm in diameter. Layers of soft material 14 can be up to 30 mm thick without causing stresses near the edge of the glazing which are too large. The materials of the pillars and the soft layers are capable of withstanding about 500° C. which is experienced during the formation of the edge seal, without excess of oxidation or annealing. The materials must also be compatible with high internal vacuum, and metals such as nickel, iron, chromium, copper, silver, gold, aluminum, and alloys of these metals are preferred. Soft films of carbon may be used for the soft material 14.

Figure 4:
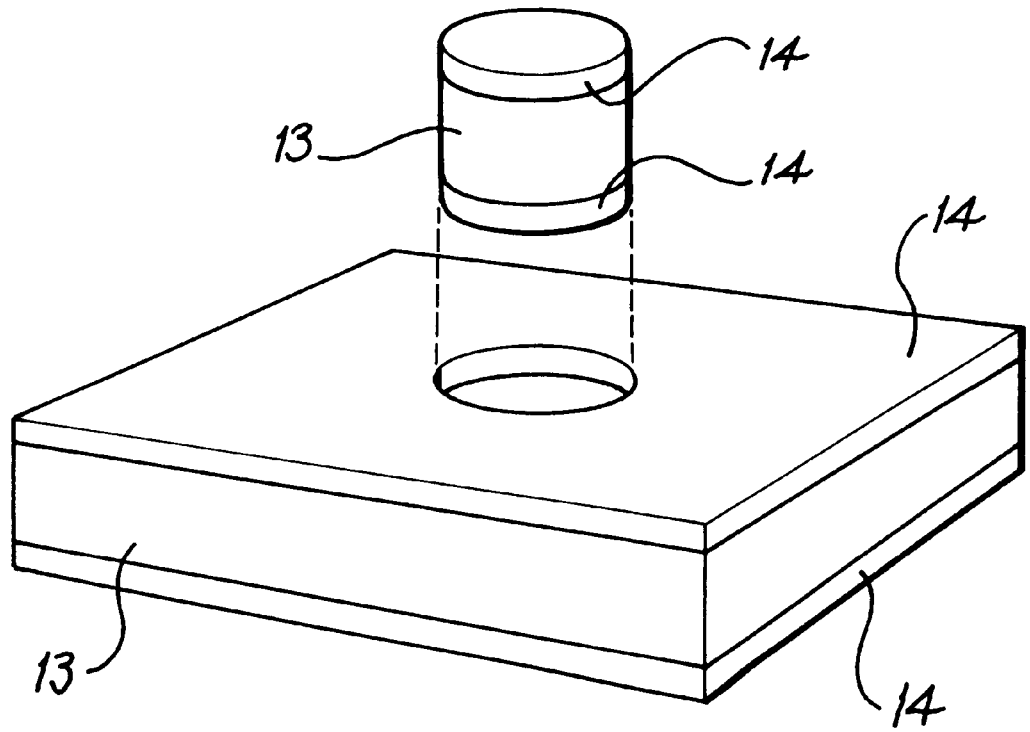
FIG. 4 illustrates a method of making a composite pillar in accordance with one embodiment of the present invention, from a laminated sheet of high strength material and soft material.

Composite support pillars may be produced, as indicated in FIG. 4, from a composite sheet of material consisting of a high strength central layer 13 and a soft layer 14 on one or both sides. The pillars 5 are then formed from this sheet by stamping, punching, abrading or sawing, or other mechanical means. Alternatively they may be chemically or electrolytically etched from the sheet using photolithographic methods.

Figure 5:
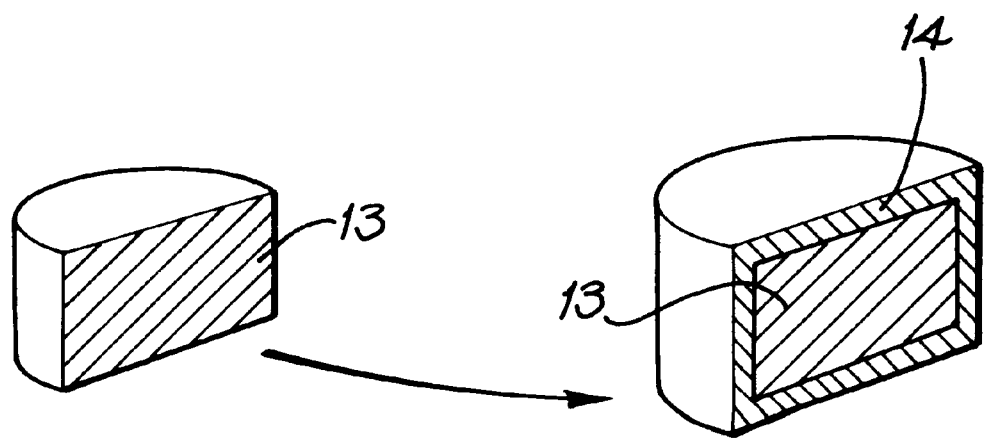
FIG. 5 illustrates a method of making a composite pillar in accordance with another embodiment of the present invention, from an individual high strength core.

An alternative way of producing pillars is to deposit the soft layer 14 after the formation of the hard cores 13. As shown in FIG. 5 the layer can be deposited using conventional electrolytic or electrolysis plating methods. In this case, the soft layer also coats the sides of the pillars, but this does not affect the operation of both layers on the ends. Pillars of this type can also be made by plastically deforming a hard core into a flat disk. The core may be coated with soft material either before or after the deformation process.

Referring now to FIG. 6, the composite support pillars comprise two flat parallel ends 15 and 16 shaped to provide stable equilibrium, and sides 17 shaped to provide unstable equilibrium, to ensure that the pillars when placed on a glass sheet will fall onto one of the flat faces and thereafter lie on that face.

Figure 6A:
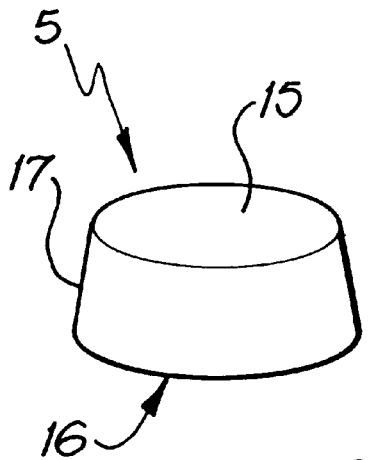
FIGS. 6a, b, c and d illustrates examples of the design of support pillars in accordance with another embodiment of the present invention.
Figure 6B:
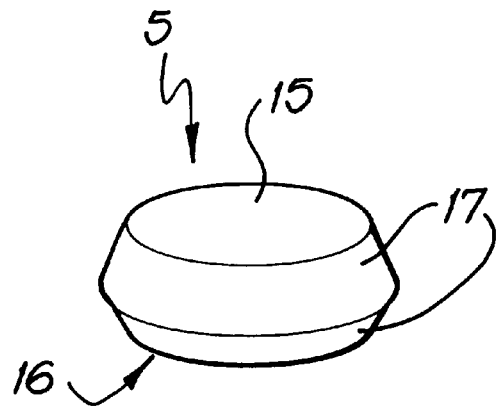
Figure 6C:
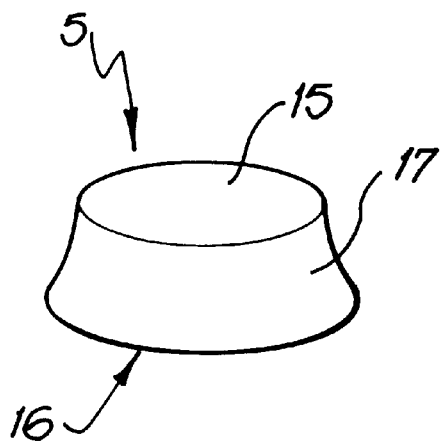
Figure 6D:
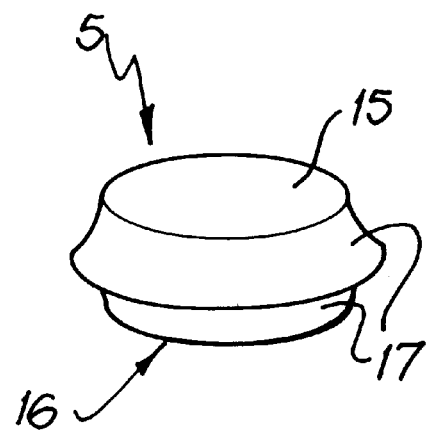

The sides 17 are tapered outwards in FIG. 6(a) with one end larger than the other. In FIG. 6(b) the sides taper from both ends in a cuspodial shape. In FIG. 6(c) the sides are curved and in FIG. 6(d) the sides are curved from both ends in a cuspodial shape.

What is claimed is:

1. Vacuum glazing comprising two sheets of glass, hermetically sealed around the edge with a thermally insulating internal vacuum, and an array of support pillars placed between the glass sheets to be in contact therewith, wherein the pillars are integrally formed elements comprising a core and a contact layer, the core being made of a material having a higher compressive strength than a softer material from which said contact layer is formed, the contact layer being arranged to provide an interface between at least one of the ends of the central body and the adjacent glass sheet, the contact layer further being arranged to absorb shear forces by deforming under the action of the shear forces.

2. Vacuum glazing according to claim 1, wherein the support pillars are 0.1 to 0.2 mm in height, and 0.2 to 0.3 mm in diameter.

3. Vacuum glazing according to claim 1, wherein the integral contact layer of soft material on one or both ends of the core body is up to 30 $\mu$m (0.03 mm) thick.

4. Vacuum glazing in accordance with claim 1, wherein the contact layer is formed from a soft metallic material selected from the group consisting of nickel, iron, chromium, copper, silver, gold. aluminium, and alloys of these metals.

5. Vacuum glazing in accordance with claim 1, wherein each support pillar comprises:

two substantially flat parallel stand faces which respectively engage said glass sheets when in a proper disposition between said glass sheets; and means for orienting each said pillar into said proper disposition when each said pillar is placed between said glass sheets, said orientation means comprising at least one side extending between said stand faces having a cross-section disposed between and parallel to said stand faces that is larger than at least one of said stand faces.

6. Vacuum glazing in accordance with claim 1, wherein the contact layer is formed from a soft carbon material.

* * * * *